(12) United States Patent
Robl

(10) Patent No.: US 10,735,834 B2
(45) Date of Patent: Aug. 4, 2020

(54) SENSOR CONNECTION ELEMENT FOR A SENSOR SYSTEM

(71) Applicant: Endress+Hauser Conducta GmbH+Co. KG, Gerlingen (DE)

(72) Inventor: Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 16/204,617

(22) Filed: Nov. 29, 2018

(65) Prior Publication Data

US 2019/0174210 A1    Jun. 6, 2019

(30) Foreign Application Priority Data

Dec. 4, 2017  (DE) .......................... 10 2017 128 741

(51) Int. Cl.
| | |
|---|---|
| *H02J 50/10* | (2016.01) |
| *G08C 17/02* | (2006.01) |
| *G01N 27/28* | (2006.01) |
| *G01N 27/30* | (2006.01) |
| *H04Q 9/00* | (2006.01) |
| *H04Q 9/02* | (2006.01) |

(52) U.S. Cl.
CPC ............... *H04Q 9/02* (2013.01); *H04Q 9/00* (2013.01); *H04Q 2209/40* (2013.01); *H04Q 2209/43* (2013.01); *H04Q 2209/88* (2013.01); *H04Q 2209/886* (2013.01)

(58) Field of Classification Search
None
See application file for complete search history.

(56) References Cited

U.S. PATENT DOCUMENTS

| | | | | |
|---|---|---|---|---|
| 6,473,711 | B1* | 10/2002 | Sittler ................. | G01L 15/00 137/597 |
| 2009/0302856 | A1* | 12/2009 | Babel ................. | G01N 27/28 324/438 |
| 2013/0054150 | A1* | 2/2013 | Sacks ................. | A61B 10/0012 702/19 |
| 2015/0155892 | A1* | 6/2015 | Haase ................. | H01Q 1/22 455/129 |

(Continued)

FOREIGN PATENT DOCUMENTS

| | | |
|---|---|---|
| DE | 102015112949 A1 | 2/2017 |
| DE | 102015113279 A1 | 2/2017 |

OTHER PUBLICATIONS

Search Report for German Patent Application No. 10 2017 128 741.8, German Patent Office, dated Jul. 23, 2018, 8 pp.

*Primary Examiner* — Curtis A Kuntz
*Assistant Examiner* — Jerold B Murphy
(74) *Attorney, Agent, or Firm* — Mark A. Logan; Endress+Hauser (USA) Holding Inc.

(57) ABSTRACT

The invention discloses a sensor connection element for a sensor, comprising: an energy store; a first data processing unit, with which is associated a first memory, for processing data and controlling a first wireless module; the first wireless module for transmitting/receiving data to/from a connection device; and a first inductive interface for transmitting energy from the energy store to the sensor, and for transmitting/receiving data to/from the sensor. The invention further discloses an energy-self-sufficient sensor system comprising the sensor connection element and a sensor.

15 Claims, 4 Drawing Sheets

(56) References Cited

U.S. PATENT DOCUMENTS

2015/0342169 A1* 12/2015 Zeevi .................... A01K 63/04
43/4.5
2017/0095206 A1 4/2017 Leib et al.
2017/0366877 A1* 12/2017 Basheer ................ G01D 18/00

* cited by examiner

SENSOR CONNECTION ELEMENT FOR A SENSOR SYSTEM

CROSS-REFERENCE TO RELATED APPLICATION

The present application is related to and claims the priority benefit of German Patent Application No. 10 2017 128 741.8, filed on Dec. 4, 2017, the entire contents of which are incorporated herein by reference.

TECHNICAL FIELD

The present disclosure relates to a sensor connection element for a sensor, and to an energy-self-sufficient sensor system.

BACKGROUND

Typically, a cable for connection to a sensor is connected to a transmitter. The connection of the cable to the sensor is frequently accomplished via a plug connection, for example by galvanically decoupled, especially inductive, interfaces. Thus, electrical signals can be transmitted contactlessly. This galvanic isolation results in advantages with regard to corrosion protection, electrical isolation, prevention of mechanical wear of the plug etc. The applicant markets such systems under the name "Memosens."

The inductive interfaces being discussed are usually realized as a system having two coils which are, for example, plugged into one another by means of the plug connection being discussed. Typically, both data (in both directions) as well as energy (from connection side to sensor side) are transmitted. The energy in this instance must be great enough to sufficiently supply the connected sensor with energy, and to thus ensure continuous measurement operation.

There are applications in which use of a cable is cumbersome or even impossible. A measurement in a laboratory may be mentioned as an example in this context. Another application may be continuous measurement at various places in surface waters.

SUMMARY

The object of the present disclosure is to operate sensors without a cable connection.

The object is achieved by a sensor connection element for a sensor, comprising: an energy store; a first data processing unit, with which is associated a first memory, for processing data and controlling a wireless module; the first wireless module for transmitting/receiving data to/from a connection device; and a first inductive interface for transmitting energy from the energy store to the sensor, and for transmitting/receiving data to/from the sensor.

In one embodiment, the energy store is a rechargeable lithium-ion battery.

In one embodiment, the connection device is designed as a smartphone, tablet, phablet, or computer.

The data that the data processing unit processes are, for instance, measured values as well as calculations therefrom, for instance averages, smoothing etc.; or conversions into a different data format; or adaptations to a specific communication system, for instance a specific fieldbus.

Data which are transmitted and received by the first wireless module are, for instance, the aforementioned measured values, calculations therefrom, or conversions thereof. In addition, firmware updates; changes to settings of the sensor or of the sensor connection element; metadata such as location information or the name of the measuring point etc. are also transmitted via the wireless module.

In one embodiment, the first wireless module is designed as a Bluetooth module, especially with the Low Energy protocol stack. In one embodiment, the first wireless module is designed as a mobile radio module, especially according to one of the mobile radio standards GPRS, EDGE, UMTS, HSDPA, LTE, or 5G.

In one embodiment, the sensor connection element comprises a second wireless module, especially a mobile radio module, especially according to one of the mobile radio standards GPRS, EDGE, UMTS, HSDPA, LTE, or 5G. In one embodiment, the second wireless module is designed as a Bluetooth module, especially with the Low Energy protocol stack.

In one embodiment, the sensor connection element is designed to be watertight at least according to the IP68 protection system.

In one embodiment, the energy store can be charged wirelessly. In one embodiment, the energy store can be charged according to the Qi charging technology standard.

In one embodiment, the sensor connection element is designed to be able to float. To this end, the sensor connection element comprises a floating body which is attached to the sensor connection element. The floating body is firmly mounted on the sensor connection element so as to be removable. The floating body surrounds the sensor connection element and is then locked, for instance by means of a swing-top closure.

In one embodiment, the floating body comprises one or more solar cells. The energy store may be charged by means of these solar cells. The floating body is attached such that a corresponding remote station for the energy store is located opposite this and charges said energy store. This ensures that the sensor connection element is continuously supplied with energy.

In one embodiment, the sensor connection element comprises a counterpart which can be permanently connected thereto, wherein the permanently connectable counterpart can be connected to a wired energy source, especially a USB charger, so that a continuous power supply to the sensor connection element via the power network results.

In one embodiment, other energy sources are used for the continuous energy supply of the sensor connection element or of the energy store. Techniques from the field of energy harvesting, such as wind power, wave motion, vibration, temperature differences etc. especially come into consideration.

In one embodiment, the sensor connection element comprises at least one solar module for charging the energy store. The sensor connection element may thereby be continuously supplied with energy, without an external component needing to be attached to the sensor connection element.

In one embodiment, the sensor connection element comprises at least one module for position determination, especially a GPS module. This allows the location of the sensor connection element to always be determinable. Especially when used in surface water, location determination is important in order to be able to link measurement data with location information. Even in the event of manual measured value detection, an association of the measured value, time stamp, and location of the measurement is advantageous.

In one embodiment, the data sent from and to the connection device also include data for position determination.

If the connection device for its part comprises a module for position determination, especially a GPS module, these location data of the connection device are sent to the sensor connection module. In the first data processing unit, these location data are linked with measured values, time stamps, or the like.

In one embodiment, the sensor connection element is designed to be explosion-proof, especially according to an Ex-I, Ex-e, or Ex-d ignition protection system.

In one embodiment, the sensor connection element comprises at least one control element. The sensor connection element may, for instance, be switched on or off by means of the control element. The recording of a data sample may also be executed by means of the control element. The measured value, a time stamp, and possibly also location coordinates are thus stored by pressing the control element, for instance. In one embodiment, the control element is realized as a mechanical pushbutton. In one embodiment, the control element is a touch-sensitive electronic sensor panel.

In one embodiment, the sensor connection element comprises at least one display element, especially an LED. In one embodiment, the sensor connection element comprises a display. In one embodiment, the display is realized as an LCD, OLED display, or electronic paper display (e-ink).

In one embodiment, the sensor connection element comprises a loudspeaker, especially a piezo loudspeaker. By means of the loudspeaker, a user may receive direct feedback from the sensor or sensor connection element without needing to look at a possible display or at the connection device. In one embodiment, messages may be output via the loudspeaker by means of beep signals. In one embodiment, messages, such as "Measurement taking place," "Calibration successful," or even the complete measured value etc. may also be output in speech via the loudspeaker.

In one embodiment, the data sent from and to the connection device also include data for speech output. If the connection device for its part comprises a loudspeaker, or generally an audio module, the data sent to the connection device for speech output are output by the connection device.

The object is further achieved by an energy-self-sufficient sensor system, comprising: a sensor connection element as described above; and a sensor comprising a second inductive interface designed to be complementary to the first inductive interface; at least one measuring element for detecting a measurand of process automation technology; and a second data processing unit which transmits data dependent on the measurand via the second inductive interface to the first inductive interface of the sensor connection element, and receives data via said second inductive interface.

In one embodiment, the sensor is cylindrical, with a diameter of approximately 12 mm.

In one embodiment, the sensor is designed as a pH, redox, conductivity, or dissolved oxygen sensor.

In one embodiment, the sensor system is designed to be able to float. To this end, the sensor system comprises a floating body which is attached to the sensor system. The floating body is firmly attached on the sensor system so as to be removable. The floating body surrounds the sensor system and is then locked, for instance by means of a swing-top closure. In one embodiment, the floating body comprises one or more solar cells. The energy store may be charged by means of these solar cells. The floating body is attached such that a corresponding remote station for the energy store is located opposite this and charges said energy store. It may thus be ensured that the sensor connection element is continuously supplied with energy.

In one embodiment, the sensor system comprises an eyelet for a retrieval cable. By means of the retrieval cable, the sensor system may be brought back into the hands of the user if said system is in the medium to be measured.

BRIEF DESCRIPTION OF THE DRAWINGS

This will be explained in more detail with reference to the following Figures.

DETAILED DESCRIPTION OF THE DRAWINGS

In figures, the same features are identified with the same reference symbols.

Figure 1:
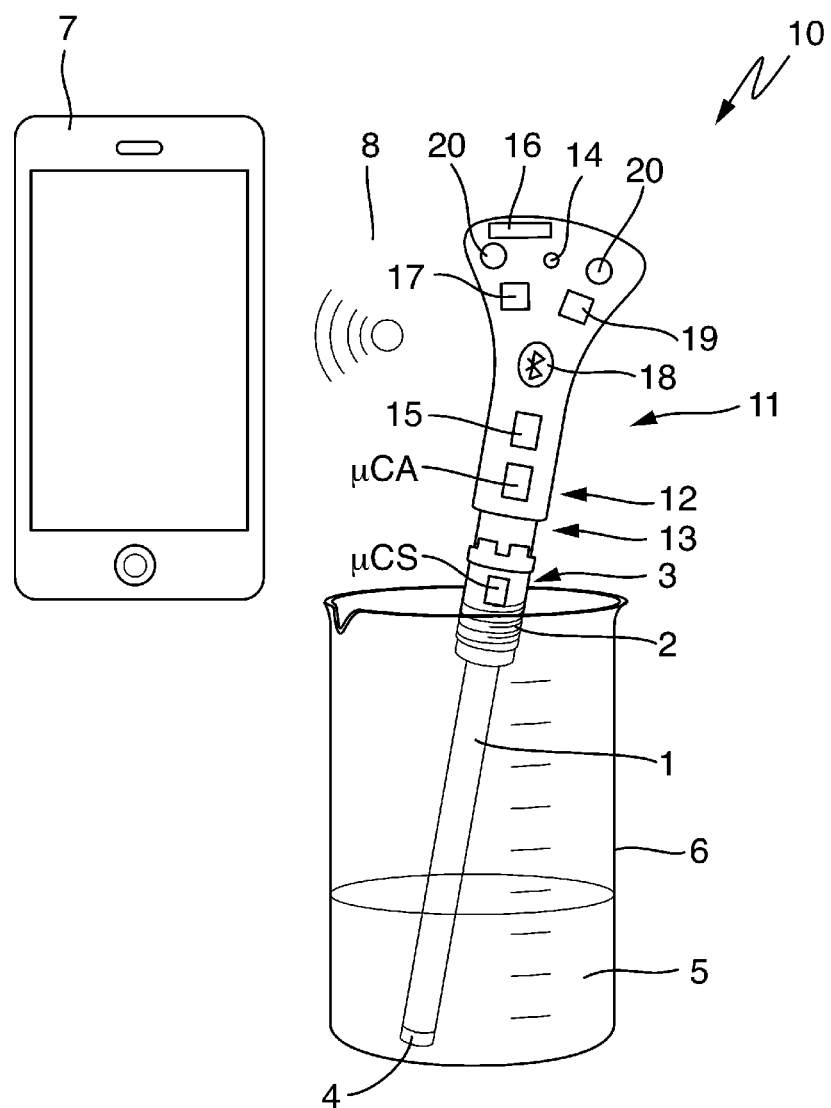
FIG. 1 shows the claimed sensor system.

The claimed sensor system in its entirety is denoted by reference symbol 10 and is shown in FIG. 1. A sensor system 10 comprises a sensor 1 and a sensor connection element 11.

The sensor 1 comprises at least one sensor element 4 for detecting a measurand. The sensor 1 is then, for instance, a pH sensor, also referred to as an ISFET, in general an ion-selective sensor, a sensor for measuring the redox potential, the oxygen, especially dissolved oxygen, the conductivity, or the temperature with the respectively corresponding measurand. In FIG. 1, the sensor measures a measured value of a medium 5 in a beaker 6.

The sensor 1 comprises a coupling body 2 which comprises an interface 3. The interface 3 is designed to transmit a value that is a function of the measurand to an interface 13 of the sensor connection element 11. The sensor 1 comprises a data processing unit μCS, such as a microcontroller, which processes the values of the measurand, e.g., converts them into a different data format. In this way, for instance, an averaging, pre-processing, and digital conversion may take place via the data processing unit μCS.

The connection element 11 comprises the interface 13, wherein this interface 13 is designed to be complementary to the other interface 3. The connection element 11 likewise comprises a data processing unit μCA.

The data processing unit μCA may serve as a repeater for the transmitted signal. Full access to all addressable sensor data is thereby achieved. A database connected to the sensor connection element 11 may then store all these data and optionally process them further.

Furthermore, the data processing unit μCA may convert or modify the protocol. For example, data may be transmitted in a first protocol from sensor 1 to connection element 11, whereas the data processing unit μCA on the side of the connection element 11 converts this first protocol into a second protocol. The data are, for instance, sent wirelessly (see below) via the second protocol.

However, the sensor connection element 11, and thereby especially the intelligent unit μCA, also carry out signal processing. In addition to the protocol conversion mentioned, the data processing unit μCA also performs mathematical calculation operations such as a conversion of the (raw) measured values supplied by the sensor 1 into another reference value. If sensor 1 supplies a raw measured value, for instance a voltage signal, the data processing unit μCA calculates the corresponding measurand depending on the sensor, for example the pH value. A further example is the mapping of a conductivity via one or more concentration tables to a substance concentration in the event of a conductivity measurement.

The data processing unit μCA comprises a memory in which the measurement data of sensor 1 may be stored over an extended period of time. The connection element 11 has data logger functionality.

The connection element 11 comprises a cylindrical coupling body 12 which is designed to be complementary to the coupling body 2 and which can be plugged with a sleeve-like end section onto the first coupling body 2, wherein the interface 13 is plugged into the interface 3. An opposite arrangement, in which the interface 13 has a sleeve-like design and the interface 3 has a plug-like design, is possible without any inventive step. Especially if the sensor system 10 is used in surface waters, a connection of the sensor connection element 11 and sensor 1 that is firm and difficult to disconnect is important. A swing-top closure is used for this purpose, for instance. This is brought about by the above-described arrangement with the coupling bodies 2, 12.

The interfaces 3, 13 are designed as galvanically separated interfaces, especially as inductive interfaces, which can be coupled to one another by means of a mechanical plug connection. The mechanical plug connection is hermetically sealed so that no fluid, for instance the medium to be measured, air, or dust, may penetrate into the inside of the connection element 11 from the outside.

The interfaces 3, 13 are designed as electromagnetic coils; in the context of this application, these are referred to as primary coil 13 and secondary coil 3. Within the scope of this application, the terms "inductive interface" and "coil" are used identically. Data (bidirectionally) and energy (unidirectionally, i.e., from the sensor connection element 11 to sensor 1) are sent or transmitted via the interfaces 3, 13.

Figure 2:
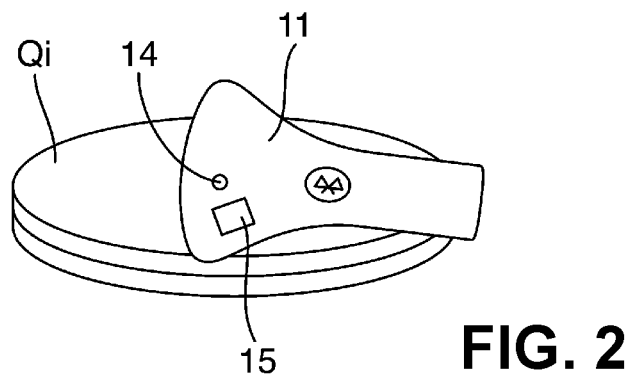
FIG. 2 shows the claimed sensor system during charging.

The sensor connection element 11 comprises an energy store 15. Energy is transmitted to the sensor 1 by means of the energy store 15. The sensor system 10 may thus be regarded as energy-self-sufficient. The energy store 15 is designed as a rechargeable lithium-ion battery. The energy store 15 is charged wirelessly; see FIG. 2 in this regard. "Qi" charging technology is preferably used for this purpose. FIG. 2 shows the charging plate Qi as a counterpart to the energy store 15 and for charging it. Alternatively or additionally, energy store 15 may be charged by means of the solar cell 16.

The sensor connection element 11 comprises a wireless module 18 for transmitting and receiving data via radio link 8 to a connection device 7. The connection device 7 is, for instance, a smartphone or tablet, but may also be designed as a computer; see FIG. 3E, for instance. The "data" may be measurement data of the sensor 1. However, the data may also be configuration values (parameters) of the sensor 1. In this instance, the sensor 1 is parameterized via the connection device 7 and transmitted by means of the interface 18 to the sensor connection element 11, and then to the sensor 1. The connection device 7 has a corresponding interface or transmitting/receiving module. The module 18 is designed as a Bluetooth interface, for instance. The Bluetooth interface especially complies with the Low Energy protocol stack as "Bluetooth Low Energy" (also known as BTLE, BLE, or Bluetooth Smart). The connection element 11 thus at least complies with the "Bluetooth 4.0" standard.

The sensor connection element 11 is designed to be explosion-proof, especially according to an Ex-i, Ex-e, or Ex-d ignition protection system.

The sensor connection element 11 comprises a display element 14. The display element 14 is designed as an LED. A plurality of display elements 14 is also possible. The user may read the status of the sensor system 10 via the display element, for instance. Possible values, which are represented in color or in a specific flashing pattern of the display element, for instance, are: measuring, calibrating, maintenance, low state of charge, system error etc.

The sensor connection element 11 alternatively or additionally comprises a display 25. The display 25 is designed as an LCD, OLED display, or electronic paper display (e-ink). The display is shown in FIG. 3A and FIG. 3B.

Figure 3A:
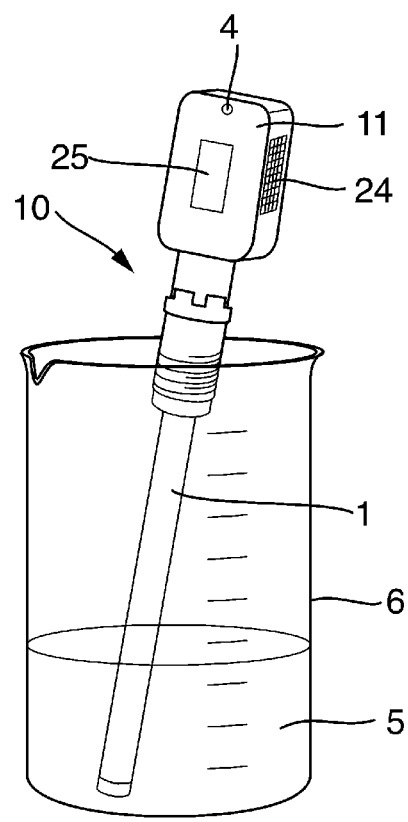
FIGS. 3A, 3B, 3C, 3D and 3E show the claimed sensor system in various application situations.
Figure 3B:
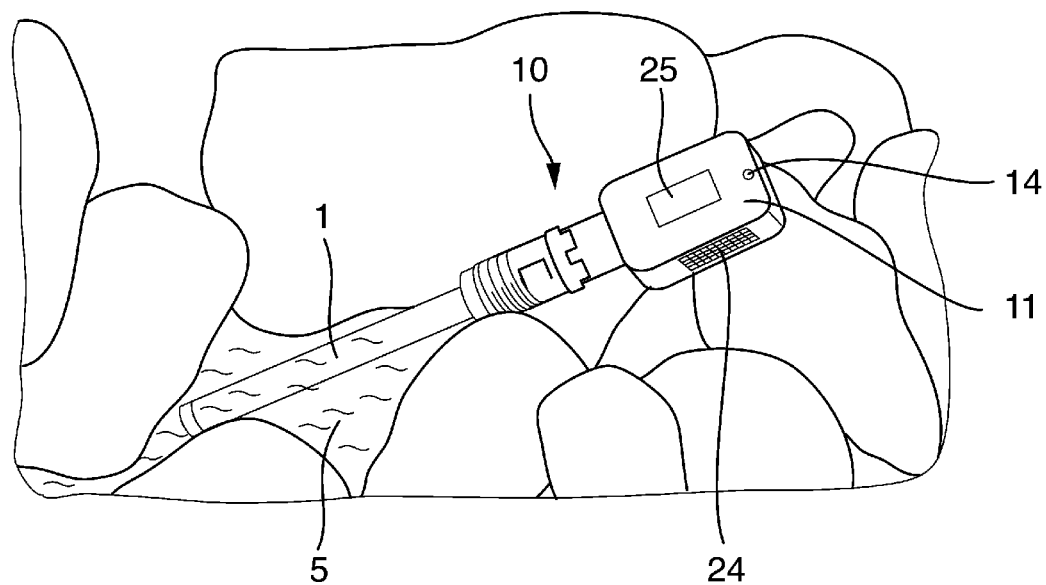

The sensor connection element 11 comprises a loudspeaker 24 which is likewise shown in FIG. 3A and FIG. 3B. The loudspeaker 24 serves to output acoustic feedback to the user. The user is thus notified that a measurement is completed, a calibration is successful etc. The output takes place either by means of beep signals or in the form of speech. Data for speech output may also be sent to the connection device 7, which then outputs these data.

The sensor connection element 11 comprises one or more control elements 20. An operation of the sensor system 10, for instance for switching on and off, starting a measurement, calibrating, establishing a radio link 8 ("pairing") etc. may be carried out via the control elements 20. A data set, thus measurement data, time stamps, and possibly location coordinates, may furthermore be stored via a control element.

The sensor connection element 11 comprises a mobile radio module 19, for instance according to one of the standards GPRS, EDGE, UMTS, HSDPA, LTE, or 5G. Measurement data of the sensor 1 may be transmitted via the mobile radio module 19 to a suitable remote station. This is particularly useful if the sensor system 10 is used in surface waters or remote regions.

The sensor connection element 11 comprises a module 17 for location determination, for instance a GPS module. If not permanently installed, the sensor system 10 may thus be recovered and additionally enables a spatial association of the determined measurements. Alternatively or additionally, a module for location determination is used by the connection device 7. For this purpose, the connection module 7 sends the location data to the sensor connection element 11, which processes these data and optionally links them with measured values, time stamps etc.

FIG. 3 shows various possible applications of the sensor system 10. FIG. 3A again shows the application in a beaker 5. FIG. 3B shows the application in a flowing body of water, for instance a river.

Figure 3C:
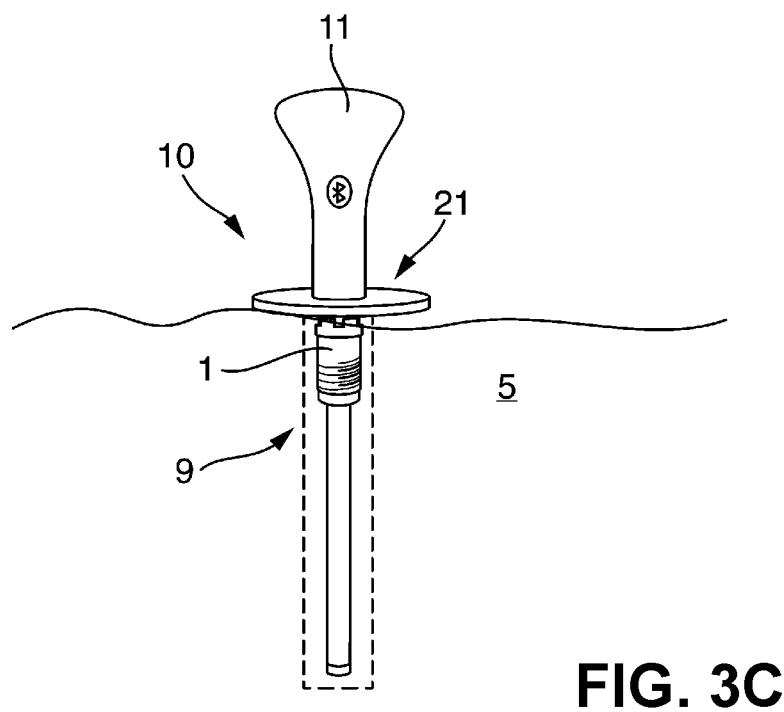

FIG. 3C shows the application on surface water, for instance on a river or lake. The sensor system 10 comprises a floating ring 21 for this purpose. The floating ring 21 is mounted around the sensor 1. The sensor system 10 thus can float. The sensor connection element 11 is designed to be watertight, according to at least the IP68 standard. The sensor 1 comprises a protective cage 9 which protects the sensor 1 and especially the measuring element 4 from damage, destruction by stones, dirt etc. The sensor system 10 may thus be set adrift on the surface water. By means of the installed module 17 for position determination, for surface water it may thus be determined at which location a measured value was ascertained. If required, these data may be sent by radio link 8 and/or mobile radio module 19.

Figure 3D:
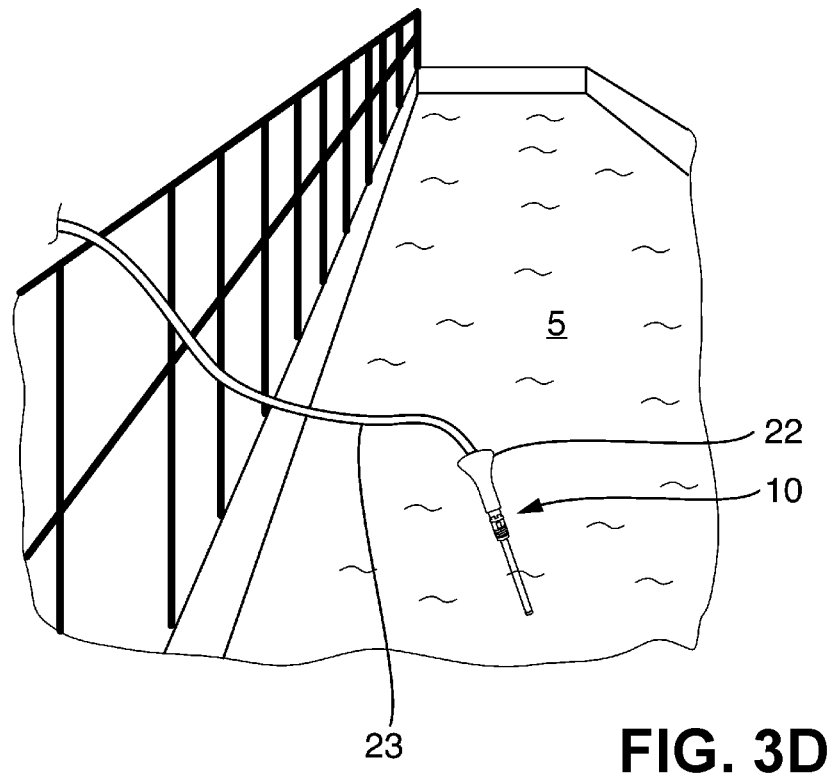

FIG. 3D shows the application in a sewage treatment plant. The sensor connection element 11 comprises an eyelet 22 through which a retrieval cable 23 may be attached. By means of the cable 23, the sensor system 10 may easily be let into the medium 5 to be measured or be retrieved again. Optionally, in this application the sensor 1 also comprises a protective cylinder 9.

Figure 3E:
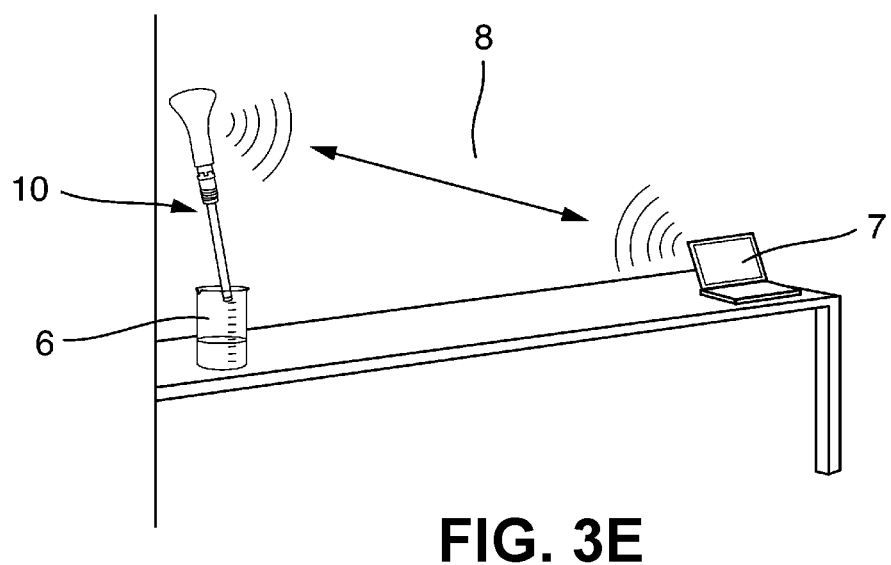

FIG. 3E shows the application in a laboratory. In this instance, the sensor system 10 is used, for example, to measure medium 5 under a hood. The measurement data are transmitted wirelessly 8 to a connection device 7, here a laptop.

The invention claimed is:

1. A sensor connection element for a sensor, comprising:
   an energy store;
   a first wireless module embodied to transmit and receive data to and from a connection device;
   a first data processing unit having an associated first memory, wherein the first data processing unit is configured to process data and to control the first wireless module;
   a first inductive interface embodied to transmit energy from the energy store to a sensor and to transmit and receive data to and from the sensor; and
   a control element embodied as a mechanical push button for switching the sensor connection element on and off, starting a measurement, calibrating the sensor, and establishing a radio link with the connection device,
   wherein the energy store is embodied to be charged wirelessly according to a Qi charging technology standard.

2. The sensor connection element according to claim 1, wherein the first wireless module is designed as a Bluetooth module with a Low Energy protocol stack.

3. The sensor connection element according to claim 1, further comprising:
   a solar module embodied to charge the energy store.

4. The sensor connection element according to claim 1, further comprising:
   a loudspeaker.

5. The sensor connection element according to claim 1, wherein the sensor connection element is designed to be watertight at least according to the IP68 protection system.

6. The sensor connection element according to claim 1, further comprising:
   a GPS module for position determination.

7. The sensor connection element according to claim 1, further comprising:
   a second wireless module according to one of the mobile radio standards: GPRS, EDGE, UMTS, HSDPA, LTE, and 5G.

8. The sensor connection element according to claim 1, wherein the sensor connection element is designed to be explosion-proof according to an Ex-I, Ex-e, or Ex-d ignition protection system.

9. The sensor connection element according to claim 1, further comprising:
   at least one display element.

10. An energy-self-sufficient sensor system, comprising:
    a sensor connection element including:
       an energy store;
       a first wireless module embodied to transmit and receive data to and from a connection device;
       a first data processing unit having an associated first memory, wherein the first data processing unit is configured to process data and to control the first wireless module;
       a first inductive interface embodied to transmit energy from the energy store to a sensor and to transmit and receive data to and from the sensor; and
       a control element embodied as a mechanical push button for switching the sensor connection element on an off, starting a measurement, calibrating the sensor, and establishing a radio link with the connection device,
       wherein the energy store is embodied to be charged wirelessly according to a Qi charging technology standard; and
    a sensor including:
       a second inductive interface complementary to the first inductive interface;
       a measuring element for detecting a measurand of process automation technology; and
       a second data processing unit configured to transmit data dependent on the measurand via the second inductive interface to the first inductive interface of the sensor connection elements, and to receive data via the second inductive interface.

11. The sensor system according to claim 10, wherein the sensor is a pH, a redox, a conductivity, or a dissolved oxygen sensor.

12. The sensor system according to claim 10, wherein the sensor system is designed to be able to float in water.

13. The sensor system according to claim 12, further comprising:
    a floating body attached to the sensor connection element and surrounding the sensor connection element.

14. The sensor system according to claim 12, further comprising:
    a protective cage surrounding the sensor and embodied to protect the sensor from physical damage.

15. The sensor system according to claim 10, further comprising:
    an eyelet for a retrieval cable.

* * * * *